April 28, 1931. P. McSHANE 1,802,771
CONTROL SYSTEM
Filed Nov. 19, 1927 2 Sheets-Sheet 1

INVENTOR
Phelan McShane.
BY
*Wesley F. Carr*
ATTORNEY

April 28, 1931. P. McSHANE 1,802,771
CONTROL SYSTEM
Filed Nov. 19, 1927 2 Sheets-Sheet 2
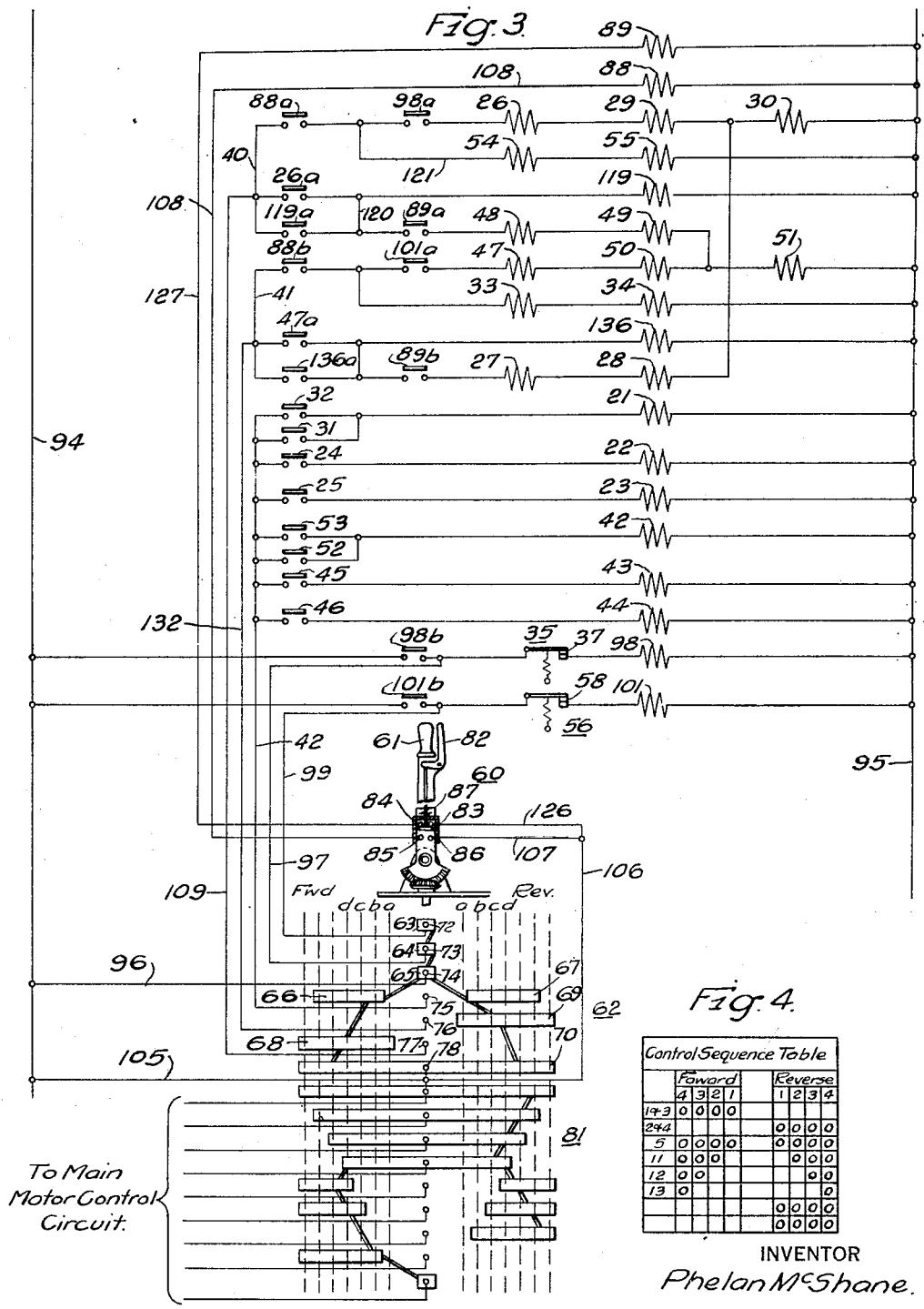

Patented Apr. 28, 1931

1,802,771

UNITED STATES PATENT OFFICE

PHELAN McSHANE, OF PITTSBURGH, PENNSYLVANIA, ASSIGNOR TO WESTINGHOUSE ELECTRIC & MANUFACTURING COMPANY, A CORPORATION OF PENNSYLVANIA

CONTROL SYSTEM

Application filed November 19, 1927. Serial No. 234,395.

The invention relates to control systems and more particularly to control systems for reversing rolling mills and the like.

The object of the invention, generally stated, is to provide a control system that shall be simple and efficient in operation and readily and economically manufactured and installed.

A more specific object of the invention is to provide for selectively controlling the operation of a plurality of auxiliary motors which actuate roll tables, with the same master controller that is utilized to govern the operation of the motor which drives the reducing rolls.

Another object of the invention is to provide for automatically deenergizing either of a plurality of auxiliary motors which actuate the roll tables when the table rollers are rotating at a predetermined speed toward the reducing rolls.

A further object of the invention is to provide for the establishment of dynamic braking circuits for one auxiliary motor when a second oppositely disposed auxiliary motor is set in operation in the opposite direction.

Other objects of the invention will become evident from the following description taken in conjunction with the accompanying drawing, in which, Figure 1 is a view in side elevation of a reversing rolling mill of a well known type.

Fig. 3 is a diagrammatic view of the circuits for controlling the various switches shown in Fig. 2.

Fig. 4 is a sequence chart indicating the preferred order of operation of the various switches shown in Fig. 2.

Figure 1:
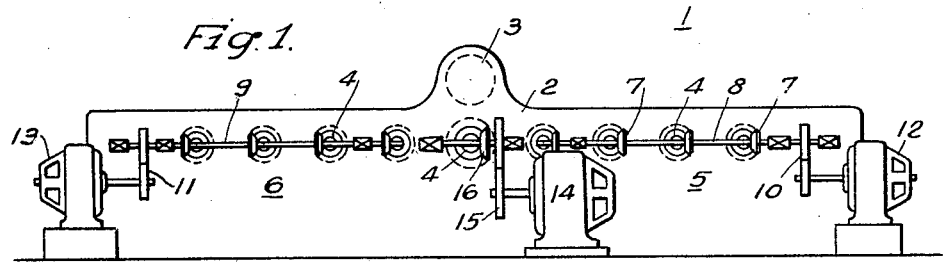

Referring to Fig. 1 of the drawing, the structure shown comprises a reversing rolling mill 1 having the usual stands or end supports 2 for the main or reducing rolls 3.

In accordance with the usual practice, a plurality of table rollers 4 are located on each side of the reducing rolls and comprise the front roll table 5 and the back roll table 6. The table rollers 4 may be driven in any approved manner and for convenience in illustration, a pair of shafts 8 and 9 extending longitudinally to the roll tables are shown and a plurality of bevel gear wheels 7 are mounted thereon and disposed to mesh with bevel gear wheels provided on the ends of the table rollers. The shafts 8 and 9 may be driven through the agency of reduction gear trains 10 and 11, respectively, by the auxiliary motors 12 and 13.

The motor 14 is provided to actuate the reducing rolls 3 and is suitably connected thereto by a reduction gear train 15 and bevel gear train 16; however, any other approved driving arrangement may be utilized.

Referring to the diagram of Fig. 2, the system shown comprises a pair of auxiliary motors 12 and 13 as shown in Fig. 1 each provided with main circuits and control apparatus which are identical, and therefore only one of the circuits will be described in detail.

The electric motor 12 which may be employed to actuate the front roll table 5 is provided with a series field winding 17 connected in circuit with a sectional starting resistor 18 which is controlled by a series of switches 21 to 23, inclusive. The switches 21 and 22 are provided with current relays 24 and 25, respectively, for controlling the acceleration of the auxiliary motor 12 in a manner to be described hereinafter.

The main circuits of the motor 12 are controlled by reversing switches 26 to 29, inclusive, and the line switch 30 which are arranged in a well known manner for controlling the direction of rotation of the motor.

The reversing switches 27 and 29 are provided with current relays 31 and 32, respectively, one of which is connected in each of the main motor circuits for the purpose of initiating the operation of the resistor short circuiting switches, as will be described in detail hereinafter.

In order to establish a series dynamic braking circuit for the auxiliary motor 12, switches 33 and 34 are provided and disposed for operation in a manner to be described hereinafter.

In order to automatically control the energization of the motor 12, a voltage relay 35 with a voltage coil 36 and contact members 37 which are normally biased to the closed position by the coil spring 38 is provided. The voltage coil 36 is responsive to the counter-electromotive force developed by the motor and is disposed to be energized, when the motor is operating in the forward direction, to effect the rotation of the table rollers of the front table 5 toward the reducing rolls 3.

Figure 2:
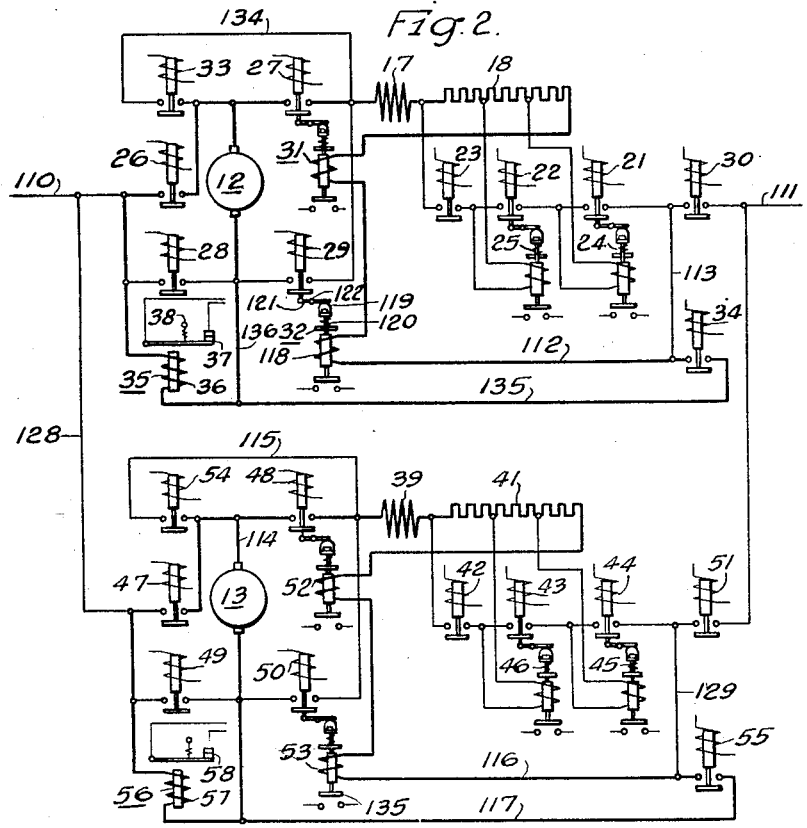
Fig. 2 is a diagrammatic view of the main circuits of a control system for controlling the operation of the auxiliary or roll table motors shown in Fig. 1, which have been connected in accordance with the present invention.

As stated hereinbefore, the system shown in Fig. 2 is also for controlling the auxiliary motor 13 which actuates the back roll table 6. The system as shown comprises the auxiliary motor 13 having a series field winding 39 and sectional starting resistor 41 with short-circuiting switches 42 and 44, inclusive, two of which 43 and 44 are provided with current relays 45 and 46, respectively, similar to the arrangement described hereinbefore in connection with the auxiliary motor 12.

The circuits of the motor 13 are controlled by reversing switches 47 to 50, inclusive, and the line switch 51, two of which 48 and 50 are provided with current relays 52 and 53. Switches 54 and 55 are also provided for establishing a dynamic braking circuit for the motor 13. A voltage relay 56 having an operating coil 57 and contact members 58 (as shown) is also provided for a purpose to be later described and similar to the voltage relay 35 as described hereinbefore.

A master controller 60 comprising a single operating lever 61 adapted for actuating a single movable element or drum 62 is utilized for controlling the various circuits. The drum 62 comprises a plurality of movable contact segments 63 to 70, inclusive, which are disposed to engage a plurality of fixed contact fingers 72 to 78, inclusive, which are associated with the control circuits for the auxiliary motors 12 and 13 as shown; and a second series of movable contact segments and fixed contact fingers designated generally by 81 which may be utilized for controlling the circuits of the reducing roll motor 14. However, a complete representation and description of the control circuits is not necessary to clearly set forth the novelty of the present invention, and, therefore, they have been omitted in the interest of simplicity in the drawing.

As will be noted, the handle 61 controls the movements of the complete series of contact segments simultaneously. The upper end of the operating lever 61 of the master controller 60 is also provided with a hand latch 82 disposed to actuate a switch 83 which is provided with contact members 84 and 85 as shown. The movable contact member 86 of the switch 83 is biased to engage the upper pair of contact members 84 by the coil spring 87.

It will be noted that the contact members 84 and 85 are connected in the operating circuits of the selector switches 88 and 89 which are disposed to control the operation of the reversing switches and main line switches of the auxiliary motors 12 and 13 as will be hereinafter described.

The actuating coils shown in Fig. 3 are for convenience designated by the same reference numerals as the switches in Fig. 2. In some cases, the switch members are omitted and only the actuating coils shown and in other cases, both the coils and switch members are shown separately in different circuits.

Figure 5:
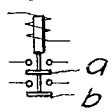
Fig. 5 is a diagrammatic view of a double pole electromagnetic switch which will be referred to in the following description.

A plurality of relay switches 88, 89, 98 and 101, such as illustrated in Fig. 5, each having a plurality of interlocks are provided for controlling circuits that will be described hereinafter. In designating the interlocks on the switches the same reference numeral and a letter corresponding to the letters applied in Fig. 5 will be adopted. As shown, the letters "a" and "b" designate the interlocks of the switch of Fig. 5.

In operating a rolling mill of this type the ingot to be worked is conveyed from the soaking pit to the front roll table. It is then passed back and forth through the reducing rolls a number of times until it is greatly reduced in cross section and increased in length.

Various methods for controlling the reducing roll motor and auxiliary motors have been resorted to and it is the usual practice to provide a separate master switch or controller for each motor, in which event several operators may be required, or else due to the lack of ability upon the part of the single operator to properly manipulate the control equipment, the auxiliary motors are allowed to operate continuously and are unnecessarily subjected to abuse by the plugging and reversing operations.

In the operation of the present system it will be observed that when the master controller drum 62 is in the "off" position as shown in Fig. 3, the contact fingers 72, 73 and 74 are engaged by the movable segments 63, 64 and 65, which establishes a plurality of circuits. One circuit may be traced from the positive line conductor 94 through conductor 96, contact fingers 74 and 73, bridged by the contact segments 64 and 65, conductor 97, contact members 37 of the voltage relay 35 and the actuating coil of switch 98 to the negative line conductor 95. Another circuit may be traced from the positive line conductor 96 through the contact fingers 74 and 72, bridged by the contact segments 63, 64 and 65, conductor 99, contact members 58 of the voltage relay 56 and the actuating coil of switch 101 to the negative line conductor 95.

The closing of the switches 98 and 101 and the interlocks 98b and 101b establishes holding circuits for the former, the first of which extends from the positive conductor 94 through interlock 98b, contact members 37 of the voltage relay 35, the actuating coil of the switch 98 to the negative line conductor 95, and the second from the positive line conductor 94 through interlock 101b and contact members 58 of the voltage relay 56, the actuating coil of switch 101 to the negative line conductor 95. The holding circuits thus established maintain the switches in their closed position as the controller handle is actuated to either its "forward" or "reverse" positions.

When the master controller 60 is actuated to set the drum 62 in its first forward position "a", then the movable contact segment 68 engages contact finger 77 and the movable contact segments 63, 64 and 65 are disengaged from contact fingers 72, 73 and 74.

With the controller in position "a", the auxiliary motor 12 of the front roll table 5 may be set in motion to carry an ingot toward the reducing rolls by actuating the hand latch member 82, to bridge the lower contact members 85 of the switch 83. Therefore, the starting of the roll table may be effected without moving the handle 61 from position "a". When the latch bridging member 86 is actuated to its bridging position a circuit is established which extends from the positive line conductor 94 through the conductors 105, 106 and 107, contact members 85 of switch 83, conductor 108 and actuating coil of switch 88 to the negative line conductor 95.

When the switch 88 is closed the selector interlock or switch 88a establishes an actuating circuit for the reversing switches 26 and 29 and the line switch 30, which may be traced from the positive line conductor 94 through conductor 105, fixed contact finger 78, contact segments 70 and 68, fixed contact finger 77, conductor 109, switches 88a and 98a and the actuating coils of the switches 26, 29 and 30 to the negative line conductor 95.

Referring particularly to Fig. 2 the operating circuit for the motor 12 may be traced from the positive line conductor 110 through reversing switch 26, motor 12, reversing switch 29, series field winding 17, starting resistor 18, the actuating coil of the current relay 31, actuating coil of the current relay 32, conductors 112 and 113, line switch 30 to the negative line conductor 111.

Simultaneously with the establishment of the actuating circuit for the line switches another actuating circuit is established which extends from the energized conductor 109, through contact members 88a, conductor 121, the actuating coils of switches 54 and 55 to the negative line conductor 95. Therefore the switches 54 and 55 are actuated to establish a series dynamic braking circuit for the auxiliary motor 13 of the back roll table 6 which may be traced from the terminal of the motor 13, through conductor 114, switch 54, conductor 115, series field winding 39, resistor 41, operating coils of the current relays 52 and 53, conductor 116, switch 55 and conductor 117 to the other terminal of the motor 13.

It will be readily understood that in the event the back roll table 6 is rotating toward the reducing rolls when the front roll table 5 is set in operation, the back roll table 6 will be quickly brought to rest by dynamic braking of its driving motor 13.

In order to clearly describe the acceleration of the auxiliary motors 12 and 13 which will be referred to in detail hereinafter, the operation of the current relays 31, 32, 52 and 53 will now be explained with particular reference to relay 32.

As referred to hereinbefore the operation of current relay 32 is controlled by the reversing switch 29 in such a way that the acceleration of the motor 12 will be controlled by the load current flowing in its circuit. Therefore the current relay 32 is disposed to control the operation of the resistor short circuiting switches 21, 22 and 23 in the following manner.

The movable element 118 of the current relay 32 comprising the armature and bridging members is adapted to be maintained in the position as shown when its actuating coil is deenergized, by a cap member 119 which is movably mounted upon the upper end of the movable element 118, and the biasing spring 120. The movable cap member 119 is disposed to be depressed in the downward direction against the force of the biasing spring 120 by a lever 121 which is pivotally mounted at 122. One end of the lever 121 is hingedly secured to the lower extremity of the movable element of the switch 29 and the opposite end rests upon the cap member 119. It can be readily understood then that when the reversing switch 29 is actuated to its closed position the cap member 119 will be depressed which will permit the movable element 118 to drop to its bridging position. However, as hereinbefore described, the actuating coil of the current relay 32 is in the motor circuit and when energized to a predetermined degree maintains the movable element 118 in its open position until the starting current of the motor is reduced to a safe value. When the current relay 32 is closed the energizing circuit of the resistor short circuiting switch 21 may then be completed as hereinafter described.

Assuming now that the auxiliary motor 12 is operating in a forward direction with the starting resistor 18 in series with its armature, then in order to initiate the acceleration of the motor 12, the controller operating handle 61 is actuated to the forward position "b" to cause the movable contact segment 66 to engage the fixed contact finger 75, thereby establishing a circuit which extends from the positive conductor 94, through conductor 105, movable segments 70, 68 and 66, contact finger 75, conductor 42, contact members of the current relay 32 and the actuating coil of the switch 21 to the negative line conductor 95. Upon the closure of the short circuiting switch 21 a section of the resistor 18 is short circuited through the actuating or current coil of the current relay 24, which is exactly the same type of relay as the current relay 32 hereinbefore described.

As will readily be seen from Fig. 3, the closing of the current relay 24 establishes a circuit extending from the energized conductor 42 through operating coil of the short circuit switch 22 causing the latter to close and decrease the resistance in the motor circuit. The closure of the switch 22 effects the energization of the current relay 25 to establish an operating circuit for the next short circuiting switch 23 which when operated connects the motor 12 directly to the line and it is accelerated to full speed in the forward direction.

It has been found in practice that continued operation of the roll table motors is unnecessary once the table rollers have attained full speed as the metal will by this time have entered the reducing rolls. Therefore, in the interest of economy in operation it is desirable to disconnect the auxiliary motor from the power source after it has attained full speed when operating to rotate the table rollers toward the reducing rolls.

In order that this function may be performed with the greatest ease and facility, the actuating coil 36 of the voltage relay 35 is disposed to be connected in shunt relation to the armature of the auxiliary motor 12 only when the line switches 26 and 29 are closed to cause the rollers of the front roll table 5 to rotate toward the reducing rolls 3. The relay 35 is thereby made responsive to the counter electromotive force developed in the motor. Therefore at a predetermined time, depending upon the setting of the voltage relay 35, the contact members 37, which are normally biased to the closed position as shown are disengaged and the energizing circuit as shown in Fig. 3 for the switch 98 is interrupted.

When the switch 98 is deenergized, contact members 98 "a" which are in circuit with the operating coils of the reversing switches 26 and 29 and the line switch 30 of the auxiliary motor 12 are opened and, therefore, the auxiliary motor 12 is deenergized.

As the rolling process progresses and the original ingot is thereby greatly increased in length and reduced in cross-sectional area to such an extent that it is very flexible, it sometimes becomes necessary to rotate the rolls of the receiving roll table "away" from the reducing rolls in order to carry the metal away from the reducing rolls.

In order to set the back roll table 6 in operation to receive metal, the dynamic braking circuit hereinbefore described is interrupted by releasing the hand latch 82, whereupon the bridging member 86 of the switch 83 returns to its normal position to bridge the contact members 84 which causes the interlock 88a to open.

Current now flows from the energized conductor 106 through conductor 126, contact members 84, conductor 127 and actuating coil of the switch 89 to the negative line conductor 95. The selector interlock or switch 89a is closed and a circuit is established from the energized conductor 40 through the contact members 119a of the switch 119, contact members 89a, the actuating coils of the line switches 48, 49 and 51 to the negative line conductor 95. Since the actuating coil of the switch 119 is in circuit with the interlock 26a of the line switch 26 the operation of the switch 119 was effected when the front roll table 5 was set in motion as described hereinbefore. The contact members 119a when closed establish a holding circuit for the switch from the energized conductor 40, through contact member 119a, conductor 120, coil 119 to the negative line conductor 95, which as can readily be seen holds the switch 119 in closed position when the interlock 26a opens.

The actuating coils 48, 49 and 51 are energized to close the corresponding reversing and line switches and an energizing circuit for the motor 13 is established which may be traced from the positive line conductor 110 in Fig. 2 through conductor 128, switch 49, armature of the motor 13, switch 48, series field winding 39, resistor 41, actuating coils of the current relays 52 and 53, conductors 116 and 129 and switch 51, to the negative line conductor 111.

Upon the operation of the line switch 48, the current relay 52 is actuated to the closed position in exactly the same manner as described hereinbefore for the current relay 32, and the motor 13. The closure of current relay 52 establishes an energizing circuit for the first resistor short circuiting switch 42 and current flows from the energized conductor 40 through the contact members of the current relay 52, actuating coil of the switch 42 to the negative line conductor 95. The closure of the switch 42 then effects the operation of the other two short circuiting switches 43 and 44 in exactly the same manner as described hereinbefore for the acceleration of motor 12.

When it is desired to return the ingot to the reducing rolls to make a pass in the opposite direction the receiving table which in this case is the back roll table 6 is reversed.

The controller handle 61 is therefore actuated to the "off" position which stops the reducing roll motor 14 and then to the reverse position "a". Then in order to initiate the operation of the back roll table 6 in a forward direction the hand latch 82 is actuated to bridge the contact members 85 of the switch 83 which energizes the selector switch 88 through the same circuit as described hereinbefore.

Upon the closure of the selector switch 88, a circuit is established from the positive line conductor 94 through conductor 105, contact fingers 78, segments 70 and 69, contact fingers 76, conductor 132, interlock members 88b of the switch 88, contact members 101a, actuating coils of the reversing switches 47 and 50 and the line switch 51 to the negative line conductor 95.

The energizing circuit for the auxiliary motor 13 is thereby established from the positive line conductor 110 in Fig. 2 through conductor 128, switch 47, armature of the motor 13, switch 50, series field winding 39, resistor 41, operating coils of the current relays 52 and 53, conductors 116 and 129 and line switch 51 to the negative line conductor 111.

In order to insure that the front roll table 5 is stopped before the metal is delivered to it from the reducing rolls, an operating circuit for the dynamic braking switches 33 and 34 of the motor 12 was simultaneously established as the motor 13 was energized, and which extends from the energized conductor 132, interlock members 88b and actuating coils of the switches 33 and 34 to the negative line conductor 95. Upon the closure of switches 33 and 34, a circuit is established from one terminal of the motor 12, through switch 33, conductor 134, series field 17, resistor 18, actuating coils of the current relays 31 and 32, conductor 112, switch 34, conductors 135 and 136 to the other motor terminal.

In order to initiate the acceleration of the motor 13 to full speed in the forward direction the operating handle 61 is actuated to the position "b" to cause the movable contact member 67 to engage the contact finger 75. Current then flows from the positive conductor 94 through conductor 105, contact finger 78 segments 70, 69 and 67, contact finger 75, conductor 42, contact member of the current relay 53 and actuating coil of the switch 42 to negative line conductor 95. In this way, the operating coil of the first resistor short-circuiting contactor 42 is energized to initiate the automatic operation of the remaining short circuiting switches 43 and 44 exactly in the same manner as described hereinbefore in connection with the auxiliary motor 12.

When the motor 13 accelerates to full speed the voltage relay 56 is actuated by the counter electromotive force and disengages its contact members 58 and consequently deenergizes the switch 101. The contact members 101a of the switch 101 are, therefore, opened and the actuating coils of the line switches 47, 50 and 51 are deenergized to disconnect the motor 13 from the line conductors 110 and 111.

In case the operator again wishes to receive the metal on a live or moving table, the operation of the auxiliary motor 12 may be initiated by releasing the latch mechanism 82 to again establish an energizing circuit for the selector switch actuating coil 89. Upon the closure of the selector switch 89 current flows from the energized conductor 132 through contact members 136a, interlock 89b, coils 27, 28 and 30 to the negative line conductor 95. The reversing switches 27 and 28 and the line switch 30 are energized and connect the auxiliary motor 12 for reverse operation through a circuit extending from the positive line conductor 110 through reversing switch 28, motor 12, reversing switch 27 series field winding 17, resistor 18, actuating coils of the current relays 31 and 32, conductors 112 and 113 and line switch 30 to negative line conductor 111. In this case, automatic acceleration of the motor 12 obtained in the same manner as described hereinbefore.

It will be noted that, by means of the above-described arrangement it is possible to control the operation of the reducing roll motor and the auxiliary motors by utilizing a single master controller and obtain greatly improved operation over that which can be obtained by employing a single master switch for each motor. Furthermore, a single operator by manipulating the simple control means herein provided can readily control the complete roll equipment with a minimum amount of physical effort.

Since certain changes may be made in the above described system and different embodiments of the invention may be made without departing from the scope thereof, it is intended that all the matter contained in the above description shall be interpreted as illustrative and not in a limiting sense.

I claim as my invention:

1. In a control system for rolling mills provided with roll tables, auxiliary motors for actuating the roll tables, means for controlling the operation of the auxiliary motors and means responsive to the speed of the auxiliary motors for interrupting the auxiliary motor circuits.

2. In a control system for rolling mills provided with roll tables, auxiliary motors for actuating the roll tables, means for controlling the operation of the auxiliary motors and means responsive to the counter-electromotive force developed by the auxiliary motors for interrupting the auxiliary motor circuits to permit the roll tables to coast of their own momentum.

3. In a control system for rolling mills, provided with reducing rolls and front and back roll tables, in combination, a motor for actuating the reducing rolls, a plurality of auxiliary motors for actuating the front and back roll tables, means for controlling the reducing roll motor, and means for controlling the operation of the auxiliary motors, said auxiliary motor control means comprising a latch for initiating the starting of the motors and means actuated in conjunction with the control means for the reducing roll motors.

4. In a control system for rolling mills, provided with reducing rolls and front and back roll tables, in combination, a motor for actuating the reducing rolls, a plurality of auxiliary motors for actuating the front and back roll tables, means for controlling the reducing roll motor, a latch actuated switch carried by said control means for initiating the starting of the auxiliary motors, and means operated in conjunction with the reducing roll motor control means for controlling the acceleration of the auxiliary motors.

5. In a control system for rolling mills, provided with reducing rolls and front and back roll tables, in combination, a motor for actuating the reducing rolls, a plurality of auxiliary motors for actuating the front and back roll tables, means for controlling the reducing roll motor, a latch actuated switch carried by said control means for initiating the starting of the auxiliary motors, means operated in conjunction with the reducing roll motor control means for controlling the acceleration of the auxiliary motors, and means for rendering the latch actuated switch ineffective to reduce the auxiliary motors to a state of inoperativeness, said means being dependent for its operation upon certain predetermined operating conditions of the auxiliary motors.

6. In a control system for rolling mills, provided with reducing rolls and front and back roll tables, in combination, a motor for actuating the reducing rolls, a plurality of auxiliary motors for actuating the front and back roll tables, means for controlling the reducing roll motor, a latch actuated switch carried by said control means for initiating the starting of the auxiliary motors, means operated in conjunction with the reducing roll motor control means for controlling the acceleration of the auxiliary motors, and a relay associated with each auxiliary motor and responsive to the counter-electromotive force developed by said motors, for interrupting the functioning of the latch operated switch to reduce said auxiliary motors to a state of inoperativeness within a predetermined time interval after their initial energization.

7. In a control system for rolling mills, provided with reducing rolls and front and back roll tables, in combination, a motor for actuating the reducing rolls, a plurality of auxiliary motors for actuating the front and back roll tables, means for controlling the reducing roll motor, a latch actuated switch carried by said control means for initiating the starting of the auxiliary motors, means operated in conjunction with the reducing roll motor control means for controlling the acceleration of the auxiliary motors, and a relay associated with each auxiliary motor, to automatically deenergize its respective motor, said relays comprising an actuating electromagnet disposed to be energized by the counter-electromotive force of its associated auxiliary motor to effect the operation of the relay at such a time as said auxiliary motor is operating to rotate the table rollers toward the reducing rolls.

8. In a control system for rolling mills, provided with reducing rolls and front and back roll tables, in combination, a motor for actuating the reducing rolls, a plurality of auxiliary motors for actuating the front and back roll tables, means for controlling the reducing roll motor, a latch actuated switch carried by said control means for initiating the starting of the auxiliary motors, means operated in conjunction with the reducing roll motor control means for controlling the acceleration of the auxiliary motors, and a relay associated with each auxiliary motor for automatically deenergizing its respective auxiliary motor, said relay being responsive to a pre-selected value of counter-electromotive force developed by the auxiliary motor when said auxiliary motor is operating to rotate the table rollers toward the reducing rolls.

9. In a control system for rolling mills, provided with reducing rolls and roll tables, in combination, a motor for actuating the reducing rolls, auxiliary motors for actuating the roll tables, a controller provided with a drum for controlling the operation of the auxiliary means cooperative with the drum for initiating and interrupting the operation of the auxiliary motors to select the auxiliary motor that is to be operated in conjunction with the reducing roll motor, said auxiliary control means being adapted to operate the auxiliary motors successively in the predetermined direction.

10. In a control system for rolling mills, provided with reducing rolls and roll tables, in combination, a motor for actuating the reducing rolls, auxiliary motors for actuating the roll tables, a controller for controlling the operation of the motors, said controller being provided with a drum, which when operated determines the direction of rotation of the motors, and a latch operated switch associated with the controller for selecting the auxiliary motor to be operated in conjunction with the reducing roll motor.

11. In a control system for rolling mills provided with reducing rolls and roll tables, in combination, a motor for actuating the reducing rolls, auxiliary motors for actuating the roll tables, a controller for controlling the operation of the motors, said controller being provided with a drum, which when operated determines the direction of rotation of the motors, and a latch operated switch for selecting the auxiliary motor to be operated in conjunction with the reducing roll motor, said latch operated switch comprising a plurality of circuit closing members and a latch mechanism for actuating the circuit controlling members, associated with the controller.

12. In a control system for rolling mills provided with reducing rolls and roll tables, in combination, a motor for actuating the reducing rolls, auxiliary motors for actuating the roll tables, a controller for controlling the operation of the motors, said controller being provided with a drum, which when operated determines the direction of rotation of the motors, and a latch operated switch associated with the controller for selecting the auxiliary motor to be operated in conjunction with the reducing roll motor, said latch actuated switch being adapted to initiate the operation of the auxiliary motors successively in the predetermined direction.

13. In a control system for rolling mills provided with reducing rolls and front and back roll tables, in combination, a motor for actuating the reducing rolls, a plurality of auxiliary motors for actuating the roll tables in either direction, a source of power for the motors, means for controlling the direction of operation of the reducing-roll motor, said means being disposed to determine the direction of operation of the auxiliary motors, a latch-actuated switch carried by the control means operable to initiate the operation of the auxiliary motors in the direction determined by the control means, and means operable in response to a predetermined operation of the latch-actuated switch for simultaneously effecting the energization of one auxiliary motor and the establishment of a dynamic-braking circuit for the other auxiliary motor.

14. In a control system for rolling mills provided with reducing rolls and front and back roll tables, in combination, a motor for actuating the reducing rolls, a plurality of auxiliary motors for actuating the roll tables in either direction, a source of power for the motors, means for controlling the direction of operation of the reducing-roll motor, said means being disposed to determine the direction of operation of the auxiliary motors, a latch-actuated switch carried by the control means operable to initiate the operation of the auxiliary motors in the direction determined by the control means, and means operable in response to predetermined successive operations of the latch-actuated switch for effecting the energization of all the auxiliary motors, thereby to cause the rolls of one roll-table to be rotated toward the reducing rolls and the rolls of the other roll-table to be rotated away from the reducing rolls.

In testimony whereof, I have hereunto subscribed my name this 10th day of November, 1927.

PHELAN McSHANE.